E. ARMSTRONG.
BEE-HIVE.
No. 170,698. Patented Dec. 7, 1875.
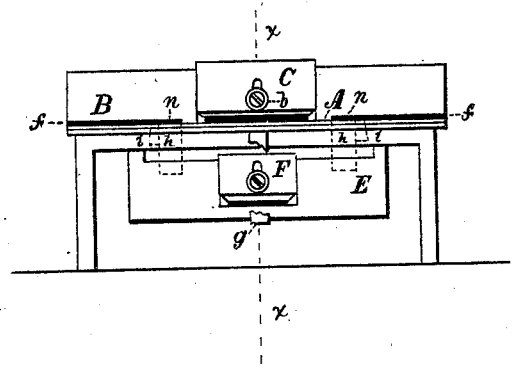
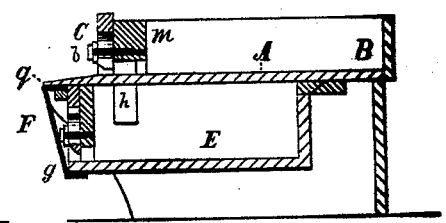
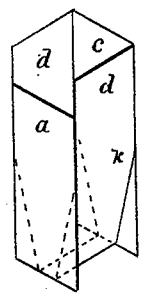
WITNESSES
L. J. Casavant
James N. Locke
INVENTOR
Elvin Armstrong
by F. S. Davenport, atty.

UNITED STATES PATENT OFFICE.

ELVIN ARMSTRONG, OF JERSEYVILLE, ILLINOIS.

IMPROVEMENT IN BEE-HIVES.

Specification forming part of Letters Patent No. 170,698, dated December 7, 1875; application filed September 25, 1875.

*To all whom it may concern:*

Be it known that I, ELVIN ARMSTRONG, of Jerseyville, in the county of Jersey and State of Illinois, have invented a new and Improved Bee-Hive; and I do hereby declare that the following is a full and exact description of the same, reference being had to the accompanying drawings and to the letters of reference marked thereon.

This invention relates to an improvement in bee-hives; and consists in a novel and improved combination of sliding doors and pitfalls, so arranged with reference to each other as to effectually entrap the drones and moths, and to admit of the moth-trap being set to operate at times when it is necessary to close the hive against the entrance or exit of the bees.

In the drawing, Figure 1 is a front view of the hive, having the comb-frames and their covering removed. Fig. 2 is a side sectional elevation of the same, taken in the line $x\ x$, Fig. 1. Fig. 3 is an enlarged view of the metallic pitfall, shown in perspective.

In Fig. 1, A represents the floor of the hive, surrounded by a rim, B, provided for the reception of the comb-frames and their covering. C represents a sliding door for closing the main entrance of the hive, and is secured in position by a fastening-screw, $b$, which passes through a slot in the door, and allows the latter to slide vertically against a rear bar, $m$. (Shown in section in Fig. 2.) E represents the moth and drone drawer, suspended below the floor of the hive, and provided with a door, F, similar to the one at the main entrance of the hive. $g$ represents a clip for supporting the front end of the drawer. $h\ h$, Fig. 1, represent small rectangular tubes inserted vertically in suitable apertures in the floor, one on each side, a little to the rear of the main entrance, and communicating with the interior of the drawer; these tubes being secured in position by small wedges $i\ i$. As the peculiar construction of these tubes forms an important feature in this device, an enlarged view of one of them is given in Fig. 3, in which $a$ is the front, $d\ d$ the two sides, and $c$ the rear. When this tube is made the corners are slit up as far as $k$; the sides are then bent as shown in the drawing, so as to narrow the aperture down to something less than sufficient to admit the passage of the body of a drone without slightly springing the sides apart. The upper part of the front $a$ is cut away to admit the moths from the outside of the hive, when, as will hereinafter be explained, communication between the interior of the hive and drawer is necessarily cut off. On each side of the main entrance is a long and narrow opening, (shown at $f$, Fig. 1,) whose only communication with the interior of the hive is across the top of the tube $h$, when the latter is set in such position that its upper edge is even with the floor of the hive.

The operation of the foregoing details is as follows: When the hive is opened the entrance-door C is raised just sufficiently high to allow the workers to pass in and out freely, and is secured in that position by the fastening-screw $b$. The tubes $h\ h$ are next secured by the wedges $i\ i$ in such position that their upper edges are even with the upper surface of the floor of the hive. The door of the drawer E is next adjusted so as to leave an opening exactly of the same width as that under the door C. Matters being thus, the working bees find no impediment to the pursuit of their daily labors. But with the drones it is otherwise; their bodies being of somewhat larger caliber, they find it impossible to make their exit by the aperture provided for the workers, and hence seek to escape by the openings shown at $n\ n$, Fig. 1. These latter can, however, only be reached by crossing the tubes $h\ h$, down which the fugitives infallibly fall, and with but little effort force their way through the narrow passage formed by the inclined flexible sides, which, closing slightly after the drone has passed through, prevents the possibility of its return.

It will be observed that the working bees will sometimes fall into the same trap, and for this reason the drawer is provided with the door F, which, being furnished with a fastening-screw similar to the one employed for retaining the door C in position, is adjusted to leave an opening of the same width as that under the door C, and, consequently, the working bees can escape, while the drones are retained.

At those times when it is necessary to close the hive the trap may be employed for securing the moths by simply raising the tubes $hh$, and securing them in position by the wedges at their sides, so that their upper edges butt against the under side of the cross-bar $m$, Fig. 2. By this means communication between the interior of the hive and the drawer is cut off, while it is retained with the exterior, over the short side $a$, Fig. 3, and through the narrow way $f$, which is purposely made just wide enough to admit the passage of the moths, which usually settle upon the front board $q$, and, finding readily the passages $ff$, seek thereby to obtain access to the hive, instead of which they are precipitated by the tubes $hh$ into the interior of the drawer, from which they are unable to escape, the door F being now closed. The removal of the drawer is effected by the withdrawal of the clip $g$, by which its front end is supported.

What I claim as my invention, and desire to secure by Letters Patent, is—

In a bee-hive, the combination of the tube $h$, provided with the short side $a$, with the fastening-wedge $i$ and opening $f$, these parts being constructed and adapted for united operation, substantially as herein described.

This specification signed and witnessed this 18th day of September, 1875.

ELVIN ARMSTRONG.

Witnesses:
O. P. POWEL,
WM. H. EDGAR.